July 4, 1961

G. A. STANIS 2,991,087

CASTER AND CAMBER ADJUSTMENT MEANS FOR
VEHICLE WHEEL SUSPENSION
Filed Aug. 7, 1958

G. A. STANIS
INVENTOR.

BY E. C. McRae
J. B. Faulkner
J. H. Oster

ATTORNEYS

United States Patent Office 2,991,087
Patented July 4, 1961

2,991,087
CASTER AND CAMBER ADJUSTMENT MEANS FOR VEHICLE WHEEL SUSPENSION

George A. Stanis, Richmond, Mich., assignor to Ford Motor Company, Dearborn, Mich., a corporation of Delaware
Filed Aug. 7, 1958, Ser. No. 753,791
1 Claim. (Cl. 280—96.2)

This invention relates to the front suspension arrangement of a motor vehicle and in particular is concerned with a new and novel arrangement of obtaining infinitely fine caster and camber adjustment of the front wheel of an independent suspension system.

In a number of suspensions, the caster and camber adjustment is obtained by the use of shims placed between the pivot bolt shaft and the frame support bracket. A conventional positioning fixture is used to hold the suspension parts in their proper position. The gap between the upper pivot arm shaft and the frame support bracket is read from a gauge and an appropriate number of shims are selected to fill the gap between the upper pivot arm shaft and the frame support bracket. The attachment bolts and nuts are then assembled and properly torqued to hold the upper pivot arm shaft and shims to the frame support bracket together.

The use of shim stock has many disadvantages. In order to get a fine adjustment, an infinite number of shim sizes must be available and used by the assemblyman. This is neither practicable nor feasible in current mass production assembly. Furthermore, burrs on the shim edges can throw off the adjustment, as can accumulated shim thickness tolerances. Because a gauge is used to measure the gap between the pivot adjustment bolt and the frame support bracket, the assemblyman may and sometimes does read the guage wrong resulting in the wrong adjustment of the caster or camber, or both.

The applicant's design contemplates an arrangement which does away with shims and reduces operator mistakes to a minimum. Like the previous design, a fixture is used to place the parts and hold them in correct alignment for caster and camber. While holding these parts in proper alignment, a pair of adjustment threaded members are threaded through apertures in the upper pivot arm shaft until the members bottom against the frame support bracket. A locking nut is then threaded upon the adjustment threaded members from the outboard side until it engages the upper pivot arm shaft. A second member threadably engages the adjustment threaded member from the inboard side of the frame support bracket to fully secure the parts in proper alignment. Parts handling and assemblyman thinking is greatly minimized while obtaining an infinitely fine adjustment. Ultimate service adjustments are also made relatively simple and foolproof by this arrangement, without an attendent increase in either production or service cost.

One of the principal objects of this invention, therefore, is to provide a structure which permits an infinitely fine caster and camber adjustment of the front wheels of an independent suspension system.

Another object of this invention is to provide a structure in which an accurate adjustment of the front wheel caster and camber in a motor vehicle independent front suspension system can be made.

Still another object of this invention is to provide adjustment means for making an accurate independent front suspension wheel caster and camber adjustment, said means being simple in design, easy to manufacture and low in cost.

Still a further object of this invention is to provide a caster and camber adjustment arrangement which requires a minimum of parts, which is reliable, and which requires a minimum amount of assembly time.

Other objects and advantages of this invention will be made more apparent as this description proceeds, particularly when considered in connection with the accompanying drawings, wherein.

Figure 1:
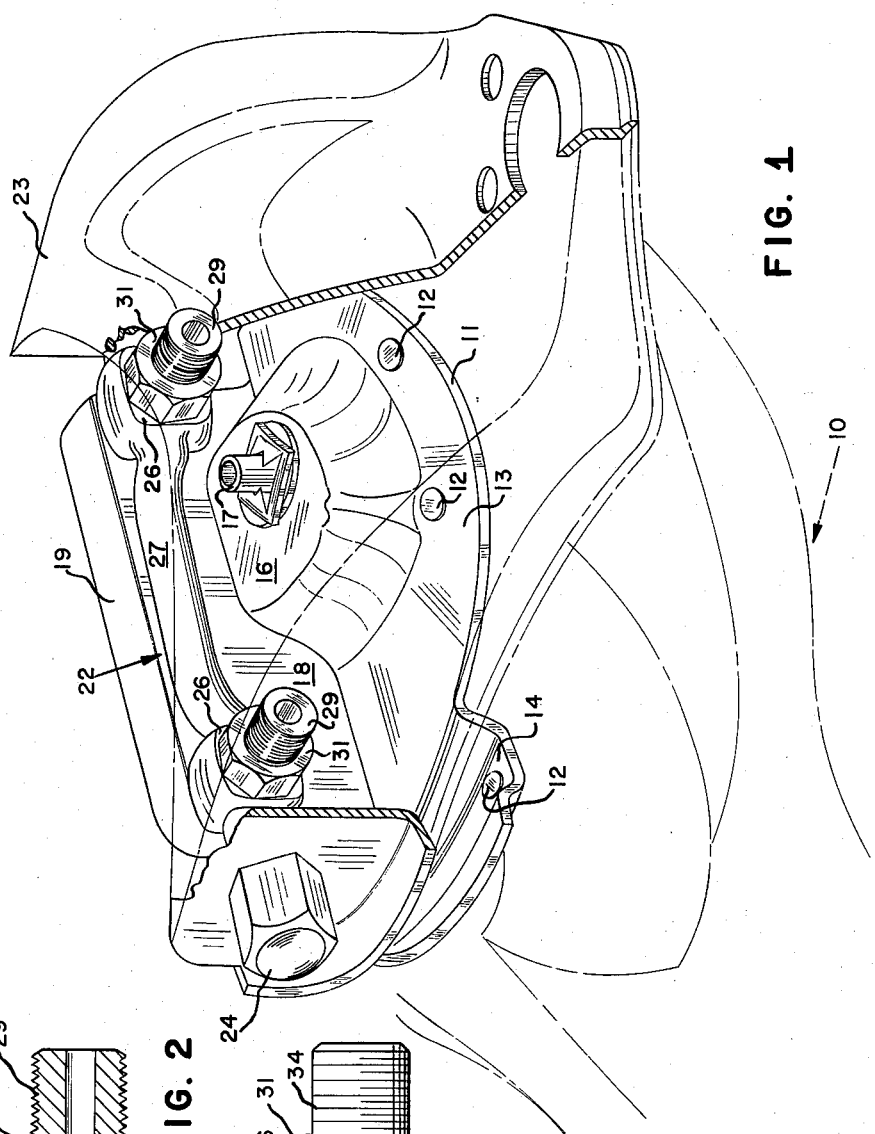
FIGURE 1 is a fragmentary perspective view partly in section of the upper part of a conventional independent suspension system showing the upper suspension arm, the upper arm pivot shaft, frame support bracket, frame portion, and applicant's novel adjustment means.

Referring now to the drawings and in particular FIGURE 1, the fragmentary upper portion of an otherwise conventional independent suspension system is shown. Although only one portion of one of the front wheel independent suspensions is shown, it is to be understood that the other front wheel suspension is constructed in a like manner. Reference numeral 10 denotes the enlarged portion of the frame side rail and is shown in dash lines. Atop the side rail, at this point, is the frame support bracket 11 which is secured to the side rail by rivets 12 disposed in the radial flanges 13 and 14. Frame support bracket 11 has a raised embossment 16 to which is secured the shock absorber 17. Inboard of the side rail 10, the bracket 11 is formed with a generally vertical wall 18 having a generally inwardly extending flange 19. Wall 18 is angled with respect to the side rail 10. A pair of apertures 21 are provided in the side wall 18 for a purpose to be described later.

An upper pivot arm shaft 22 is provided in a predetermined spaced apart relationship to the side wall 18. Shaft 22 is provided with conventional internally threaded end portions (not shown) upon which are mounted conventional resilient bushing assemblies (not shown) upon which is supported the upper suspension arm 23. Arm 23 is secured in place by bolts 24 (one of which is shown) which are threaded in the internally threaded shaft end portions. This portion of the disclosure is well known in the art and is found in many of the currently manufactured independent suspension vehicles. The wheel supporting structure is also well known and does not require a detail disclosure to understand the applicant's invention.

Applicant's invention is directed to the mechanical attachment of the upper pivot arm shaft 22 and the side wall 18 in a manner to obtain the proper caster and camber adjustment of the road wheel through the physical positioning of the upper suspension arm 23 supported upon the upper pivot arm shaft 22.

Upper arm pivot shaft 22 has a pair of enlarged hub like portions 26 joined by connecting portion 27. The enlarged hub like portions 26 are provided with enlarged threaded apertures 28 substantially axially aligned with apertures 21 in the side wall 18. The diameter of the apertures 28 is substantially greater than the diameter of the apertures 21 for a purpose to be later explained.

Figure 2:
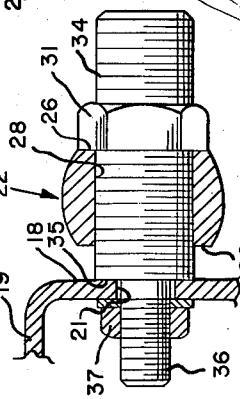
FIGURE 2 is a cross sectional view taken through the embodiment shown in FIGURE 1; and, FIGURE 3 is similar to FIGURE 2 and shows a modification of the adjustment means.

Referring now to the preferred embodiment disclosed in FIGURE 2, an exteriorly threaded adjustment stud 29 is threaded through each of the apertures 28 while the upper arm pivot shaft 22, upper suspension arm 23, and secured suspension parts are held by fixtures in the appropriate spaced apart position relative to the side wall 18 until the end of adjustment stud strikes the side wall 18. A lock nut 31 is then secured to the outside of the adjustment stud 29 and against the hub like portions 26. Stud 29 is centrally hollowed to provide an enlarged threaded bore 32 to receive bolt 33 which is secured to the bore 32 from the inboard side of the side wall 18.

Figure 3:
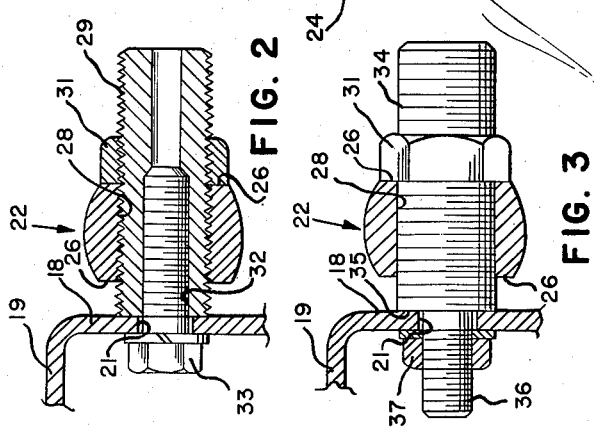

In FIGURE 3, a modification of the adjustment stud is disclosed. The externally threaded stud 34 is provided with an axial threaded projection 36 and a radial shoulder 35. Projection 36 extends through the apertures 21 in the side wall 18 to the point where the shoulder 35 bottoms against the side wall 18. Locknut 31 also secures the shaft 22 to the stud from the outboard side of the suspension, while nut and lockwasher 37 secure the stud 34 to the side wall 18 from the inboard side of the suspension.

The simple method by which the applicant obtains his caster and camber angle also permits an infinitely fine range in the way of adjustment and furthermore maintains the parts in a rigid non-moving manner. It is, of course, possible to modify the adjustment stud to make the part easily adjustable for service by providing screw slots in the end of the stud by forming a hex or square in the end of the stud, etc.

It will be understood that the invention is not to be limited to the exact construction shown and described, but that various changes and modifications may be made without departing from the spirit and scope of the invention, as defined in the appended claim.

What is claimed is:

Caster and camber adjustment means for a front road wheel of a motor vehicle independent front suspension, comprising a frame support bracket adapted to be fixedly secured to a sprung portion of the motor vehicle, said frame support bracket having a vertically extending side wall and a pair of spaced apart apertures in said vertically extending side wall, an upper suspension arm adapted to be mounted upon an unsprung portion of the vehicle, an upper suspension arm pivot shaft adapted to be journaled in the upper suspension arm, said upper suspension arm pivot shaft having a pair of hub-like connected portions, an internally threaded aperture in each of said hub-like portions, said upper suspension arm pivot shaft being disposed along side but in spaced apart relationship to said vertically extending side wall with the internally threaded apertures being located in substantial axial alignment with the apertures in the vertically extending side wall, a pair of externally threaded studs, each of said studs having an enlarged internally threaded central bore, each of said studs threadably engaging one of the internally threaded bores of the upper suspension arm pivot shaft and bottoming against the side wall and positioning said upper suspension arm pivot shaft a predetermined distance from said frame support bracket vertically extending side wall, bolt means extending through each of the apertures in the vertically extending side wall and threadably engaging the internally threaded central bore of each stud and anchoring each stud to the vertically extending side wall, and nut means engaging each stud and securing the stud to the upper suspension arm pivot shaft.

References Cited in the file of this patent

UNITED STATES PATENTS

| | | |
|---|---|---|
| 1,204,688 | Rude | Nov. 14, 1916 |
| 1,829,551 | Wambsgans | Oct. 27, 1931 |
| 2,096,115 | Leighton | Oct. 19, 1937 |
| 2,115,915 | McCain | May 3, 1938 |
| 2,611,625 | Kishline et al. | Apr. 24, 1946 |
| 2,635,895 | Wahlberg | Apr. 21, 1953 |
| 2,882,066 | Petrak | Apr. 14, 1959 |
| 2,890,062 | Perkins | June 9, 1959 |